United States Patent Office 3,826,770
Patented July 30, 1974

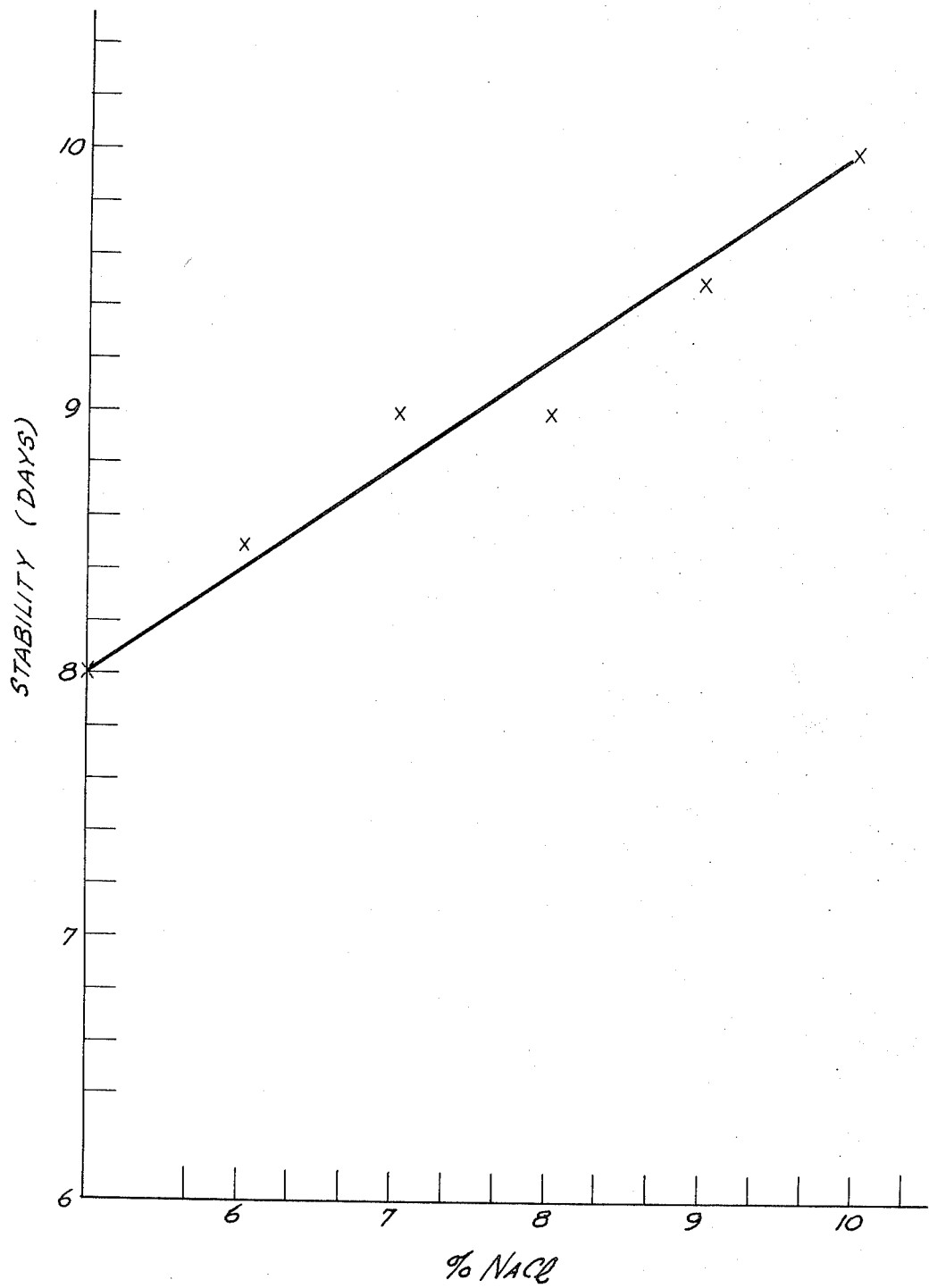

3,826,770
STABILIZED MIXTURE OF UREA FORMALDE-
HYDE AND METHYLOLUREAS
Ross Leon Christensen and Paul Robitschek, Eugene,
Oreg., assignors to Chembond Corporation, Springfield,
Oreg.
Filed Mar. 13, 1972, Ser. No. 234,030
Int. Cl. C08g 51/24
U.S. Cl. 260—29.4 R    2 Claims

ABSTRACT OF THE DISCLOSURE

A method of making a storage stabilized aqueous solution of urea, formaldehyde, and nonpolymeric addition products thereof. The solution is stabilized to inhibit the crystallization of methylolureas by the inclusion of a dissolved, ionized, inorganic salt. A method of making a consolidated product from the stabilized solution is also disclosed.

---

This invention relates to the preparation of an aqueous solution of urea, formaldehyde, and methylolurea addition products of urea and formaldehyde, which has been storage stabilized to inhibit crystallization of methylolureas from the solution. Such solutions are useful as compositions that are convertible, with the application of heat, into a resinous condensation product of urea and formaldehyde, which may be used as a binder.

A particular embodiment of the invention concerns the use of such aqueous solutions in the production of a consolidated product such as particle board or hardboard, with the reactive components of the solution reacting in situ, in a condensation type of reaction, to produce a resin binder holding the particles in the product together.

Resinous condensation products of urea and formaldehyde are known in the art. Such resinous products have been used in the wood products industry as binders in the manufacture of a consolidated product from a comminuted material such as fibers or chips. Difficulties have been encountered in the manufacture of hardboard or particle board from wood fibers or other fine wood particles using such resins, because of their tacky nature. If such a resin is introduced with mixing to a mass of wood particles or fibers, there is a tendency for the fibers to adhere together, which introduces problems in properly blending the materials, and forming the mat which is ordinarily prepared prior to making the board. Additionally, the tacky nature of the resin causes buildup in the blender and other machinery of fiber deposits, introducing a considerable cleaning problem. Because of the difficulty of obtaining a uniform blend, the consolidated product such as hardboard which is ultimately produced has nonuniform physical properties. These various difficulties have deterred from widespread accepted use of urea formaldehyde type resins as a binder when handling certain types of materials.

So-called urea-formaldehyde concentrates are known which are true solutions, containing urea and formaldehyde and nonpolymeric addition products of urea and formaldehyde; such as the methylolureas, which term includes monomethylolurea, dimethylolurea, etc. In such solutions, the urea and formaldehyde which have combined to form, for instance, the nonpolymeric monomethylolurea addition product, are the chemical equivalent of free urea formaldehyde, since they are available for resin forming reactions in a condensation type of reaction. In these so-called urea-formaldehyde concentrates, the mole ratio of formaldehyde to urea in the concentrate generally lies within the range of about 3.5 to 6:1. With the usual urea formaldehyde resin being the condensation product of a reaction mixture containing a much lower mole ratio of formaldehyde to urea, usually within the range of about 1 to 2.5:1, the usual urea-formaldehyde concentrate solution is not adapted for use alone as the resin forming material in a consolidated wood product.

In the commercial manufacture of a product such as hardboard, there is the additional requirement that any chemical composition that is employed in the production of a resin binder be stable. Any composition which is unstable introduces such difficulties as having to prepare for utilization only small batches of the composition, to insure that its properties do not undergo material change, the requirement that the composition be used with close supervision, and the likelihood of inconsistent physical properties in the final product. Waste can also result because of an inability to use a composition because of an irreversible change having taken place therein.

A general object of this invention is to provide a stable, aqueous solution of urea, formaldehyde and nonpolymeric addition products of urea and formaldehyde, which is free of tack and suitable for use in the manufacture of a consolidated product from lignocellulose material as a material which is convertible into a resin binder for the product.

Yet another object of the invention is to provide a novel method of preparing a stable aqueous solution of urea, formaldehyde and nonpolymeric addition products thereof, which with heat is convertible into a resinous binder.

A still further object of the invention is to provide a novel method of manufacturing a consolidated product from lignocellulose material, such as hardboard, where urea and formaldehyde are introduced to the lignocellulose material as the components of a stable, nontacky, aqueous solution of urea, formaldehyde and addition products thereof.

These and other objects and advantages of the invention will become more fully apparent from a reading of the following description which describes in more detail the general concepts of the invention as well as specific examples thereof. The accompanying drawing graphically illustrates storage stability obtained practicing the invention.

According to this invention, a convertible solution is prepared comprising urea, formaldehyde, and nonpolymeric addition products of urea and formaldehyde dissolved in water, the solution being stabilized by the inclusion therein of dissolved, ionzed, norganic salt.

The water in the solution usually is within the range of from about 15% to 50% by weight. While a greater amount of water may be included, such ordinarily is not desirable in a mixture prepared for use in the manufacture of hardboard, for example, where is is desirable to limit moisture in the material being consolidated to minimize blistering, etc.

The mole ratio of formaldehyde to urea in the reactive solution is prepared to be within the range of about 1 to 2.5:1, such being the proper mole ratio of these ingredients desired in the resinous material into which the reactive solution converts.

The dissolved salt plays the important role of inhibiting crystallizing out of methylolureas from the solution, which occurs in a matter of hours in the absence of the stabilizer, but which can be prevented for a period of many days with the inclusion of the salt.

The convertible solutions of the invention are readily prepared by adding urea, which is a water soluble material, directly to a urea-formaldehyde concentrate solution, to adjust the mole ratio of formaldehyde to urea to within the above-indicated desired range. Additionally, some water may be added, where adjustment in the condensed solids in the solution is desired. Further incorporated with the urea-formaldehyde concentrate solution is the inorganic stabilizing salt, whch readily dissolves in the solution together with the urea. It has been observed that there is no specific order of addition required of these components to the urea-formaldehyde concentrate solution. Thus, the salt or water additions may precede the addition of the urea. Alternatively, the water addition may be made at different times, with some added before the urea and some afterwards.

In addition to water, the convertible solutions may be prepared with the additions of small amounts of such nonpolar solvents as methanol, ethanol and acetone. While these solvents alone and without the salt have been found to have little effect on storage stability, in some instances, and when included with the dissolved inorganic salt, the presence of such solvents has been noted to increase to some degree the storage stability to be expected before crystallization occurs.

The convertible solutions that are the product of this invention are nontacky solutions, ordinarily of relatively low viscosity. Thus, the solution normally exhibits a viscosity of less than E on the Gardner-Holt scale (determined at 25° C.), the viscosity usually being less than C on such scale. In referring to nontacky solutions, it is intended to delineate solutions having a tack point in excess of 8 hours, as determined by the so-called cotton-pick test which is a recognized method known in the art of measuring tack in resins and related products. In this connection, it should be observed that most conventional resins, even so-called low tack resins, have a tack point of less than 2 hours, the tack point actually rarely exceeding 1 hour. Comparing the tack points of the solutions of the present invention, in preferred solutions the tack point exceeds 15 hours and usually is in excess of 24 hours.

Describing the cotton-pick test as performed in the art and as performed in measuring the tack points of the instant solutions, it consists of drawing down a 1.5 mil film of the material being tested on a ground glass plate. After being prepared, the film is pressed lightly with a one inch wad of surgical cotton at frequent intervals. A fresh cotton surface is used for each contact. The time is noted when the film pulls fibers from the cotton wad. This point in time is called a tack point, or the point when the film ceases to be fluid and becomes tacky in nature. The test is performed at room temperature, i.e., approximately 25°, plus or minus 2° C., at about 50% relative humidity.

Because of the properties described, with the convertible solutions of the instant invention, the solutions may be sprayed or otherwise distributed with comminuted lignocellulose material, without balling or bunching of the material after the blending thereof and without the lignocellulose material subsequently forming accumulations on the equipment handling it.

It has been found that the convertible solutions of the invention may be utilized in the production of a composite product such as hardboard, by spraying or otherwise blending the solutions with the usual defibered wood which is employed in the manufacture of hardboard. The furnish that results may then be prepared in a mat or layer, and subjected to the heat and pressure which is typical of conventional hardboard manufacture. With the application of heat (typically ranging from about 200 to 500° F.), a urea formaldehyde resin binder is formed in situ, and it is this binder which functions to hold the lignocellulose particles together in the final board.

Optimumly the pH of the convertible solutions is maintained within the range of about 6 to 8.5. With a lower pH, there is a tendency after a period of time for condensation to proceed, with thickening of the solution and introduction of tack. With a pH appreciably above 8.5, the storage stability of the solution is effected, with premature methylourea crystallization being observed. The usual urea-formaldehyde concentrate solutions are essentially neutral solutions. As a consequence, it is deisred that a salt be employed as a storage stabilizer that does not produce a major pH change.

The solutions of the invention are stabilized by the inclusion therein of a dissolved ionized salt, normally in an amount ranging up to about 12% by weight of the solution. In most instances the upper limit of the salt which is added is determined by the solubility of the salt in the solution. With some salts, such as potassium iodide, which are highly soluble, the percentage of the salt material included may exceed the 12% limitation indicated. However, in most instances, even with the highly soluble salts, no particular advantage is noted by exceeding a 12% by weight concentration.

An ionized salt is defined herein as a salt of an acid having an acidic disassociation constant which is greater than $10^{-5}$, and the salt of a base having a basic disassociation constant which is greater than $10^{-5}$, the disassociation constant of at least one of these, i.e., either the acid or the base, being greater than $10^{-2}$. In order to introduce a practical quantity of the salt into the solution, the salt should have a solubility of not less than about 1% by weight. Illustrating salts that have been employed are the chloride salts, such as sodium, potassium, lithium and magnesium chlorides, sodium sulfate, sodium formate, etc.

Solutions as prepared herein have been found to have the requisite storage stability to enable them to be used successfully in commercial panel production. In this connection, from a commercial standpoint, a storage stability of at least three days is desirable if the material is to be acceptable. Storage of the solution may be performed at ordinary storage temperatures, within the range of about 10° to 30° C.

The convertible solutions of the invention may be used directly in the manufacture of products such as hardboard without the addition of any catalyst, and with the solutions converting into a condensed resin binder, in situ, under the conditions used in compressing and consolidating the board. However, it is possible, if it is desired to shorten press times, to introduce a catalyst to the solution, and this normally would be done just before the solution is blended with the lignocellulose material. For example, faster cures are possible through the addition to the convertible solution of a catalyst such as an aqueous solution of ammonium chloride of 10% concentration, with such being added in an amount equal up to about 3% of the weight of the convertible solution.

The following examples further illustrate the invention, and its utility in the manufacture of a consolidated lignocellulose product. In the example, and when a urea-formaldehyde concentrate solution is discussed, the percent by weight of urea (or formaldehyde) indicated refers to the percent by weight of the ingredient disregarding whether such is present in a free or a combined form as a methylolurea. Parts referred to in the example are parts by weight unless otherwise indicated.

Example 1

1500 parts of a urea-formaldehyde concentrate solution, at about 25° C., containing 50.5% formaldehyde, 20.5% urea, and 29% water, were mixed with 700 parts of urea, with gentle stirring and at room temperature until the urea had totally dissolved. The solution so produced had a mole ratio of formaldehyde to urea of about 1.5:1. The original urea-formaldehyde concentrate solution had a pH of about 7.5, and this was substantially unaffected by the addition of the urea.

Ninety parts of the solution including the added urea were mixed with 10 parts of sodium chloride, with the salt dissolving in the solution with gentle stirring. The stabilized convertible solution so prepared had a pH of 7.5, and a viscosity of E on the Gardner-Holt scale. The solution exhibited no crystallinity on standing for a period of 10 days at room temperature (25° C.). A sample of the solution without the added salt developed crystallinity at the end of 12 hours, and completely solidified in 15 hours. The tack point of the solution at the end of 10 days, as determined by the cotton-pick test, exceeded 24 hours.

Example 2

An aqueous solution of urea-formaldehyde concentrate solution and urea, containing a 1.5:1 mole ratio of formaldehyde to urea, was prepared as in Example 1. Sodium chloride was added to six different fractions of this solution to storage stabilize these fractions. The various fractions had pH's of about 7.5 in all instances. The sodium chloride additions ranged in amount from about 5% to about 10% by weight. The stabilized reactive solutions thereby produced all exhibited stability exceeding 8 days, as demonstrated by the graph which forms the drawing accompanying this specification. The tack point of all the solutions, prior to their exhibiting crystallinity, exceeded 24 hours.

Example 3

To illustrate the effect of pH adjustments in convertible solutions prepared as contemplated, a solution of urea-formaldehyde concentrate and urea was prepared as in Example 1. As storage stabilizers, sodium chloride and methanol were added, to produce concentrations of these materials in the solution of 10% and 4.3% by weight, respectively. The pH of the resultant solution with stabilizer was 7.5. The solution on standing for 12 days at 25° C. exhibited no crystallinity. The solution on being prepared had a viscosity of C on the Gardner-Holt scale, which increased to between E and F after this 12-day period. The tack point of the solution at the end of the 12 days exceeded 24 hours.

The pH's of six different fractions of the solution described, obtained directly after preparation of the stabilized solution, were adjusted by the addition of formic acid to lower the pH, and by the addition of triethanolamine to raise the pH, to produce pH's in the fractions distributed between 6 and 8.5, as set forth in the accompanying table. These various solutions exhibited a storage stability in days which increased from 5 days in the case of the fraction having a pH of 6, to 12 days in the fraction having a pH of 7.5, and decreasing to 6 days in the fraction having a pH of 8.5. In the case of the lower pH values, the termination of storage stability was noted by a sharp increase in viscosity and lowering of tack point, occurring over a matter of hours, indicating advancement of the urea and formaldehyde to a resin type of product. In the case of the higher pH values, termination of storage stability was noted by crystallization being observed. All solutions had a tack point exceeding 24 hours prior to the end of their storage stability period.

TABLE I

| pH | Stability (days) |
|---|---|
| 6.0 | 5 |
| 6.5 | 8 |
| 7.0 | 12 |
| 7.5 | 12 |
| 8.0 | 9 |
| 8.5 | 6 |

Example 4

A convertible solution having a pH of 7.5 was prepared as in Example 3. Different fractions of this solution were stored at various temperatures to determine the effect of temperature on storage stability. In all cases, termination of storage stability was noted by the appearance of crystallinity. The following table sumarizes the results obtained.

TABLE II

| Temperature ° C. | Stability (days) |
|---|---|
| 0 | 4 |
| 10 | 16+ |
| 25 | 12 |
| 35 | 4 |

Example 5

A solution of urea-formaldehyde concentrate and urea having a 1.5:1 mole ratio of formaldehyde to urea was prepared as in Example 1. Sodium chloride and methanol were added to one fraction of the solution, to produce concentrations in percent by weight in such fractions of 8.6% and 4.4%, respectively. The resultant convertible solution had a pH of about 7.5, and a storage stability of 12 days at 25° C., exhibiting over such 12 days a viscosity increase of two bubbles on the Gardner-Holt scale, and a final viscosity of D. The tack point of the solution at the end of 12 days exceeded 24 hours.

A convertible solution as so prepared was used in the preparation of particle board. In preparing the board, mechanically comminuted wood particles were sprayed with the solution, with tumbling of the particles in a drum. The solution was applied in an amount sufficient to distribute about 6.5% by weight theoretical solids on the wood particles. The resulting furnish so prepared was free of tack.

Mats were prepared from the furnish of approximately 2-inch thickness, and these mats were consolidated into boards with the application of heat at 320° F. and pressure at 500 p.s.i.g. Particle board panels of about ⅝-inch thickness resulted. Three different panels were prepared, using different press times as indicated in the accompanying table. The panels that resulted were evaluated for internal bond, modulus of rupture, density, and thickness. The results obtained are listed in the table mentioned. With respect to the various properties set forth in the table, the panels are comparable to panels prepared from conventional urea formaldehyde resins.

TABLE III

| Press time | IB, p.s.i. | MOR, p.s.i. | Density, lbs./ft.³ | Thickness, in. |
|---|---|---|---|---|
| 3′45″ | 179 | 3,303 | 42.9 | .616 |
| 4′25″ | 184 | 3,266 | 44.3 | .614 |
| 6′25″ | 175 | 3,352 | 42.9 | .609 |

The following table summarizes other preparations of reactive solutions according to this invention. A salt, to introduce stability, and in some cases methanol and ethanol, was incorporated as indicated. Listed in the table is the storage stability recorded for the individual solutions, and the viscosity gain observed in such solutions over a storage period.

TABLE IV

| Mole ratio of formaldehyde to urea | Wt. percent Stabilizer | Wt. percent Diluent | Stability (days at 25° C.) | Viscosity gain during stable period (bubbles, Gardner-Holt at 25° C.) |
|---|---|---|---|---|
| 1.5 | Na₂SO₄, 6% | MeOH, 3% | 4 | 1 |
| 1.5 | LiCl, 10% | None | 18 | 1 |
| 1.5 | LiCl, 10% | MeOH, 9.1% | 19 | 1 |
| 1.5 | KCl, 10% | MeOH, 7% | 10 | 1 |
| 1.5 | NaHCO₂, 10% | MeOH, 7% | 4 | 1 |
| 1.2 | NaCl, 10% | MeOH, 4.1% | 7 | 2 |
| 1.2 | NaCl, 10% | MeOH, 11% | 12 | 2 |

In other preparations, storage stabilized convertible solutions were prepared from urea-formaldehyde concentrate solutions containing a mole ratio of formaldehyde to urea of 3.6:1, and 6.0:1, respectively, and about 30% water. By the addition of urea, the mole ratio was adjusted to 1.5:1. These solutions when stabilized with sodium chloride exhibited a storage stability of 10 days or more.

As has been discussed above, urea-formaldehyde concentrate solutions are reactive solutions containing urea, formaldehyde and nonpolymeric addition products of urea and formaldehydes, such as monomethylolurea, dimethylolurea, etc. The formation of such methylolureas is a reversible one, affected by pH and other factors, so that the particular amounts of urea or formaldehyde, or a particular methylolurea, in a particular solution, is hard to determine. With the addition of urea to such urea-formaldehyde solutions, solutions are produced which again comprise a mixture of urea, formaldehyde, and methylolurea additions products.

The following example illustrates the nonpolymeric nature of such a solution.

Example 6

To 500 parts of a urea-formaldehyde concentrate solution containing 252 parts formaldehyde, 102 parts urea and 145 parts water, 136 parts of urea were added, and the solution was further diluted with 188 parts of water. The resultant solution had a formaldehyde to urea mole ratio of approximately 2.1:1, and comprised approximately 40% water. Through the addition of caustic, the pH of the solution was adjusted to 10.2. Within three hours of the pH adjustment, crystallization of methylolurea commenced, and a totally solid mass was formed at the end of ten hours. Purification of this mass produced a yield of 440 grams of dimethylolurea, melting at 126° C. Such constitutes a yield of approximately 92% of maximum theoretical yield based on the amount of urea present in the solution.

The same solution when prepared and stabilized with 71 grams of sodium chloride exhibited no crystallinity over a period exceeding four days.

Generally characterizing the convertible solutions of the invention, such were nontacky solutions over their indicated storage life. The solutions generally had a viscosity of E or lower on the Gardner-Holt scale at 25° C. after their original preparation. The solutions show a viscosity increase over their storage life of less than three bubbles on the Gardner-Holt scale. The solutions were easily incorporated with a lignocellulose material such as wood fibers, as by spraying, without encountering the usual problems present when a resin is applied, such as balling up of material and the collection of material accumulations on the handling equipment.

It should be noted that the convertible solution, when such is added to the lignocellulose material, contains urea and formaldehyde or the equivalent thereof intimately mixed and in proper proportions for the formation, in situ, of the resin binder. Resinification occurs on the application of heat, at the usual temperatures employed in the making a hardboard or particle board product. The method of making a board product according to the invention does not require the addition of formaldehyde as a separate ingredient, with mixing of this material with other chemicals during the distribution process. As a consequence, more uniform board products are obtainable, and less supervision is required in the manufacturing of the furnish.

While various embodiments of the invention have been described and illustrated herein, it is appreciated that changes and variations are possible, and it is intended to include within this invention all such variations and modifications as would be apparent to one skilled in the art.

It is claimed and desired to secure by Letters Patent:

1. The method of preparing a stabilized aqueous solution of urea, formaldehyde and methylolureas, comprising introducing urea into an aqueous solution of urea-formaldehyde concentrate having a mole ratio of formaldehyde to urea ranging from about 3.5 to 6:1, in sufficient quantity to adjust the mole ratio of formaldehyde to urea to within the range of about 1 to 2.5:1, and dissolving in the solution a soluble ionizable inorganic salt to stabilize the solution from methylolurea crystallization, the solution prepared having no more than about 50% water, the inorganic salt being the salt of an acid having an acidic disassociation constant greater than $10^{-5}$ and the salt of a base having a basic disassociation constant greater than $10^{-5}$, at least one of said disassociation constants being greater than $10^{-2}$, the pH of the solution being within the range of 6 to 8.5 and having a tack point exceeding 15 hours by the cotton-pick test.

2. A method of preparing a consolidated product from comminuted lignocellulose material, comprising providing in a storage facility a nontacky aqueous solution of urea, formaldehyde, and methylolureas, said solution having a tack point exceeding 15 hours by the cotto-pick test and a mole ratio of formaldehyde to urea within the range of about 1 to 2.5:1, said solution further having therein to stabilize the solution from crystallization of methylolureas a dissolved ionized inorganic salt, said salt being the salt of an acid having an acidic disassociation constant which is greater than $10^{-5}$ and the salt of a base having a basic disassociation constant which is greater than $10^{-5}$ and at least one of said disassociation constants being greater than $10^{-2}$, the pH of the solution being within the range of 6 to 8.5, removing solution from said facility and mixing said solution with the lignocellulose material to produce a nontacky mass of such material having said solution distributed therein, and with heat and pressure consolidating the lignocellulose material to produce the consolidated product with the solution condensing to form a resin binder binding the lignocellulose material together.

References Cited

UNITED STATES PATENTS

| 2,056,142 | 9/1936 | Ripper | 260—69 R |
| 2,175,475 | 10/1939 | Ludwig | 260—29.4 R |
| 2,625,524 | 1/1953 | Kvalnes | 260—29.4 R |
| 3,247,149 | 4/1966 | Alek | 260—29.4 R |
| 3,649,397 | 3/1972 | Peters | 264—128 |

LORENZO B. HAYES, Primary Examiner

U.S. Cl. X.R.

156—62.2; 264—128